United States Patent
Podilchuk

(10) Patent No.: US 8,311,341 B1
(45) Date of Patent: Nov. 13, 2012

(54) ENHANCED METHOD FOR COMPARING IMAGES USING A PICTORIAL EDIT DISTANCE

(75) Inventor: Christine Podilchuk, Warren, NJ (US)

(73) Assignee: D & S Consultants, Inc., Eatontown, NJ (US)

( * ) Notice: Subject to any disclaimer, the term of this patent is extended or adjusted under 35 U.S.C. 154(b) by 0 days.

(21) Appl. No.: 13/216,418

(22) Filed: Aug. 24, 2011

Related U.S. Application Data

(63) Continuation-in-part of application No. 11/947,726, filed on Nov. 29, 2007, now abandoned.

(60) Provisional application No. 60/861,685, filed on Nov. 29, 2006.

(51) Int. Cl.
*G06K 9/68* (2006.01)
*G06K 9/62* (2006.01)

(52) U.S. Cl. .......................... 382/218; 382/209

(58) Field of Classification Search .............. 382/103, 382/173, 218, 219, 118, 209
See application file for complete search history.

(56) References Cited

U.S. PATENT DOCUMENTS

| | | | |
|---|---|---|---|
| 4,503,557 A | 3/1985 | Maeda | |
| 4,901,362 A | 2/1990 | Terzian | |
| 5,459,739 A | 10/1995 | Handley | |
| 5,751,286 A | 5/1998 | Barber | |
| 5,757,959 A | 5/1998 | Lopresti | |
| 5,761,538 A | 6/1998 | Hull | |
| 5,832,474 A | 11/1998 | Lopresti et al. | |
| 5,875,446 A | 2/1999 | Brown | |
| 5,940,778 A | 8/1999 | Marfurt | |
| 6,134,344 A | 10/2000 | Burges | |
| 6,161,130 A | 12/2000 | Horvitz | |
| 6,295,371 B1 | 9/2001 | Rucklidge | |
| 6,480,670 B1 * | 11/2002 | Hatano et al. ................. 386/329 |
| 6,502,105 B1 | 12/2002 | Yan et al. | |
| 6,581,034 B1 | 6/2003 | Choi et al. | |
| 6,616,704 B1 | 9/2003 | Birman | |
| 6,633,857 B1 | 10/2003 | Tipping | |
| 6,741,725 B2 | 5/2004 | Astle | |
| 6,898,469 B2 | 5/2005 | Bickford | |
| 6,944,602 B2 | 9/2005 | Cristianin | |
| 7,054,847 B2 | 5/2006 | Hartman | |

FOREIGN PATENT DOCUMENTS

EP 0949580 A2 10/1999

OTHER PUBLICATIONS

Podilchuk, Christine, "A New Face Recognition Algorithm Using Bijective Mappings" 2005 IEEE Comp Soc Conf on Comp Vision and Pattern Recognition, Jun. 20-26, 2005, vol. 3, pp. 165 US.

Hsuan Shih Lee, "A Fast Algorithm for Computing the Transitive Closure [etc]", IEEE Proc of the ICSC Cong on Comp Intel Meth and Appl, pub. 1999 (Jun. 22-25, 1999) US.

Bhatnagar et. al., "Syntactic Pattern Recognition of HRR Signatures", SPIE Proc v 4053, 190, pp. 452-466, Soc of Photo-Opt Instrum Eng, Bellingham, WA (2000).

(Continued)

*Primary Examiner* — Daniel Mariam
(74) *Attorney, Agent, or Firm* — Fox Rothschild LLP; Dennis M. Carleton

(57) ABSTRACT

A method and system is described for determining the distance between first and second images using an enhanced P-Edit distance metric which accounts for differences in the rotation or pose of objects identified in the images.

20 Claims, 3 Drawing Sheets

OTHER PUBLICATIONS

Oommenn, et. al., "On Using Parametric String Databases and Vector Quantization [etc]" IEEE Proc. Int. Conf. on Sys, Man and Cyber, v 1, p. 511-517 IEEE, Piscataway, NJ (1997).

Chen, "Fast Schemes for Computing Similarities Between Gaussian HMMs [etc]" EURASIP Jour on Appl Sign Pro (EURASIP J. Appl. Sig Pro v 2005, n 13, Aug. 1, 2005 p. 1984-1993 (US).

Asano, "Efficient Algorithms for Optimization-Based Image Segmentation" (NDN-174-0695-5802-4) IEEE Int Jour of Cmop Geo & App, v11, No. 2, 2001 p. 145-166 (US).

Menico, "Faster String Searches (Boyer-Moore Algorithm)" Dr. Dobb's Journal of Software Tools, v14 n7 pub Jul. 1989 p. 74-78 (US).

* cited by examiner

ENHANCED METHOD FOR COMPARING IMAGES USING A PICTORIAL EDIT DISTANCE

CROSS-REFERENCE TO RELATED APPLICATIONS

This application is a continuation-in-part of U.S. patent application Ser. No. 11/947,726, filed Nov. 30, 2007, which claims benefit of U.S. provisional patent application Ser. No. 60/861,685, filed on Nov. 29, 2006, which is herein incorporated by reference. This application also incorporates by reference U.S. non-provisional patent application Ser. No. 11/619,133 filed on Jan. 2, 2007.

FIELD OF THE INVENTION

The present invention relates generally to the field of techniques for analyzing graphical data and, in particular, methods and systems for computerized comparing graphical contents of 2D images.

BACKGROUND OF THE INVENTION

Recognition of objects of interest (referred to herein as "targets") in graphical contents of 2D images is used by military, law enforcement, commercial, and 20 private entities. Typically, the goal of target recognition is identification or monitoring of one or more targets depicted in images produced by surveillance apparatuses or images stored in respective databases or archives. In various applications, target recognition may be performed in real time or, alternatively, using pre-recorded data.

It has been recognized in the art that there are difficulties associated with 25 computerized, i.e., automated, comparing of the graphical contents of images. In particular, many challenges in the field of computerized target recognition relate to identification of targets that change their appearance due to orientation, lighting conditions, or partial occlusions.

Despite the considerable effort in the art devoted to techniques for comparing images, further improvements would be desirable.

SUMMARY OF THE INVENTION

One aspect of the invention provides a method for comparing images. The method is directed to determining a degree of similarity between elements of graphical contents of the compared images based on a pictorial edit distance between the images.

The method includes the steps of defining matrixes of blocks of pixels in the compared images, comparing the blocks of pixels using a block matching algorithm, expressing a degree of correlation between the blocks of pixels using the Insertion, Deletion, and Substitution Error terms of the Levenshtein algorithm for matching or searching one-dimensional data strings, defining the pictorial edit distance as a weighted sum of such components of the blocks of pixels, and using the Levenshtein algorithm to compare the images.

Another aspect of the present invention provides a system using the inventive method for comparing the images.

Various other aspects and embodiments of the invention are described in further detail below.

The Summary is neither intended nor should it be construed as being representative of the full extent and scope of the present invention, which these and additional aspects will become more readily apparent from the detailed description, particularly when taken together with the appended drawings.

Figure 1:
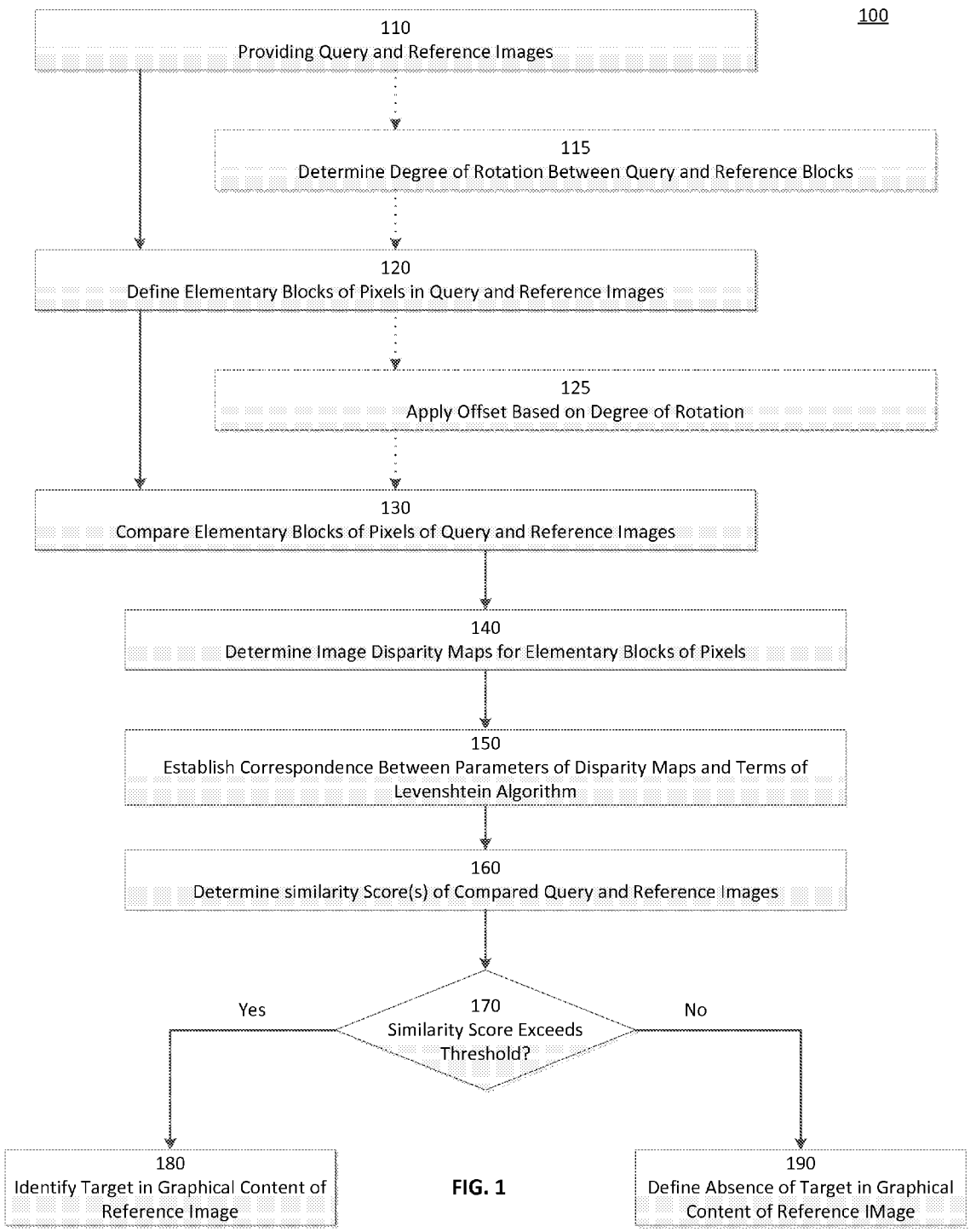
FIG. 1 is a flow diagram illustrating a method for comparing images in accordance with one embodiment of the present invention.

To facilitate understanding, identical reference numerals have been used, where possible, to designate similar elements that are common to the figures, except that suffixes may be added, when appropriate, to differentiate such elements. The images in the drawings are simplified for illustrative purposes and have not necessarily been drawn to scale.

The appended drawings illustrate exemplary embodiments of the invention and, as such, should not be considered as limiting the scope of the invention that may admit to other equally effective embodiments. It is contemplated that features or steps of one embodiment may beneficially be incorporated in other embodiments without further recitation.

DETAILED DESCRIPTION OF THE INVENTION

Figure 2:
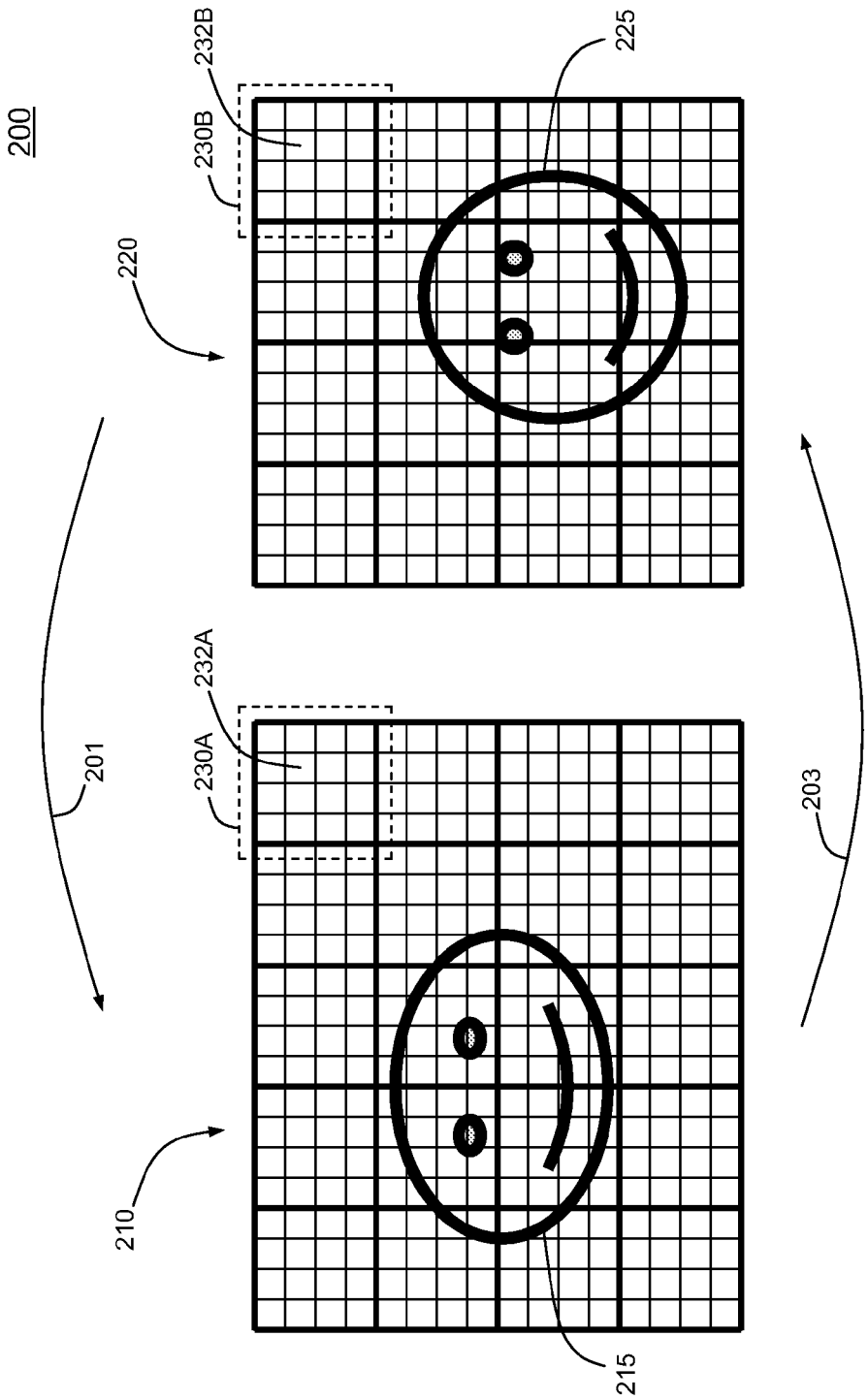
FIG. 2 is a schematic diagram illustrating the method of FIG. 1.

Referring to the figures, FIG. 1 depicts a flow diagram illustrating a method 100 for comparing images in accordance with one embodiment of the present invention, and FIG. 2 depicts a schematic diagram 200 illustrating the method 100. To best understand the invention, the reader should refer to FIGS. 1-2 simultaneously.

In various embodiments, method steps of the method 100 are performed in the depicted order or at least two of these steps or portions thereof may be performed contemporaneously, in parallel, or in a different order. For example, portions of steps 120 and 130 may be performed contemporaneously or in parallel. Those skilled in the art will readily appreciate that the order of executing at least a portion of other discussed below processes or routines may also be modified.

Aspects of the present invention are illustratively described below within the context of images depicting live objects such as humans or body parts thereof. The invention may also be utilized within context of images depicting material objects, such as missiles or their plumes, vehicles, objects floating in air, free space, or liquid, beams of light, and the like, as well as images depicting a combination of various live or material objects. It has been contemplated and is within the scope of the invention that the method 100 is utilized within the context of such images.

At step 110, referring to FIG. 2, a 2D image 210 (referred to hereafter as a "query image") and a 2D image 220 (referred to hereafter as a "reference image") are provided. Illustratively, the reference image 220 depicts an object 225 to be compared to a target 215 depicted in the query image 210. Generally, the target 215 and object 225 are depicted surrounded by live or material elements of their respective conventional habitats, conditions, or environments. For a purpose of graphical clarity, in the images 210 and 220 such elements are not shown.

Herein, the method 100 is discussed referring to the query and reference images depicting a single object (reference image 220) or a single target (query image 210). In alternate embodiments, query or reference images depicting several such objects or targets may similarly be compared using processing steps of the method 100. In a further embodiment, at step 110, no specific target 215 is specifically identified in a graphical content of the query image 210, and the method 100 determines if an object resembling the object 225 exists in the graphical content of the query image and identifies that object as the target 215.

In the depicted exemplary embodiment, the query and reference images 210, 220 are digitized 2D images illustratively having the same digital resolution (i.e., number of pixels per unit of area), and their graphical contents (i.e., target 215 and object 225) have approximately the same physical dimensions, or scale factors.

Generally, at least a portion of these properties in available query and reference images may differ from one another or at least one of the query and reference images 210, 220 may be a portion of a larger image plane. At step 110, respective properties of such query and reference images are normalized.

In particular, a normalization process may adjust scale factors or digital resolution of the query or reference images, equalize or approximately equalize physical dimensions of particular elements in the images or the images themselves, produce copies of the query and reference images having different digital resolutions, and the like. Such normalization of the images increases probability and reduces computational complexity of recognizing the object 225 in a graphical content of the respective query image 210.

At step 120, matrixes of elementary blocks 230A, 230B (one elementary block 230A and one elementary block 230B are shown outlined using a phantom line) of pixels 232A and 232B are defined in the query image 210 (blocks 230A) and the reference image 220 (blocks 230B). Accuracy of comparing the query and reference images 210 and 220 decreases with the size (i.e., number of pixels) of the blocks 230, however, use of smaller blocks 230 increases duration of time and computational resources needed to compare the images.

Generally, the elementary blocks 230A and 230B may contain M×N pixels, 232A and 232B, respectively, where M and N are integers. For example, for an original image of 100×100 pixels, the elementary blocks 230A and 230B may contain 2×2, 4×4 (as shown), 4×2, 5×5, 10×10, 25×25, 50×50, etc. In the depicted embodiment, the query image 210 includes 16 blocks 230A, and the reference image 220 includes 16 blocks 230B, each such block containing 16 pixels. In practice, a block size is chosen that divides the original image into an integer number of blocks.

At step 130, the query and reference images 210 and 220 (or portions thereof) are compared using a block matching algorithm that selectively maps elementary blocks 230 of one of these images onto respective digital domains of the other image by performing, for example, pixel-by-pixel comparison of the blocks of pixels.

In one embodiment, the blocks 230A and 230B are exhaustively compared to one another in a translational motion across image planes of the query and reference images 210, 220. For example, each elementary block 230B of the reference image 220 is sequentially compared to the elementary blocks 230A of the query image 210 (referred to herein as "forward" mapping and illustrated with an arrow 201). Similarly, each elementary block 230A of the query image 210 may sequentially be compared to the elementary blocks 230B of the reference image 220 (referred to herein as "backward" mapping and illustrated with an arrow 203).

A degree of similarity between graphical contents of the respective elementary blocks 230 may be assessed using cost functions such as, for example, a mean absolute difference (or L1 error) or a mean square error (or L2 error). When a numerical value of a cost function is smaller than a first pre-selected threshold Q1, the compared elementary blocks are considered as having the same graphical content. Accordingly, when the numerical value of the cost function is greater than a second pre-selected threshold Q2, the compared elementary blocks are considered as having totally different, or unmatchable, graphical contents, and graphical contents of the elementary blocks are considered as partially matched when $Q1 \leq Q \leq Q2$.

In an enhanced version of the algorithm, to increase probability of recognizing the target 215 in the graphical content of the query image 210, such forward or backward mapping may also be performed with different offsets (not shown), in units of pixels, between the being compared elementary blocks 230A and 230B. For example, for at least one of the images 210 or 220, a plurality of matrixes of non-overlapping block 230 may be defined and used by the respective block-matching algorithm.

Applying an offset may be particularly useful, for example, when matching blocks containing faces or other objects having differing profiles or rotations. For purposes of illustration, assume that a query block contains a frontal view of a face and reference block contains a right profile of a face. First, to make the determination of whether or not an offset should be applied, and how much of an offset, the degree of rotation from the query block to the reference block must be determined at step 115. The amount of offset may be directly proportional to the degree of rotation between the query image and the reference image. The degree of rotation may be determined using a pre-processor that determines, for example, facial position. If a frontal profile is being matched to a right profile, it is assumed that the best matching block will be to the right of the original block. Therefore, the block will be offset to the right. The amount of offset may be dependent on the degree of rotation between the object in the query block and the object in the reference block. After the offset is applied at step 125, processing continues to the block matching algorithm at step 130.

At step 140, image disparity maps are defined for the elementary blocks 230A and 230B. The image disparity maps (i) identify elementary blocks P1 having the same graphical content, elementary blocks P2 having partially matching graphical contents, and elementary blocks P3 having unmatchable graphical contents, and (ii) identify, in units of per cents, portions $\delta 1$, $\delta 2$, and $\delta 3$ of the elementary blocks 230 having one-to-many, one-to-none, and matching error correspondences, respectively, where $\delta 1+\delta 2+\delta 3=100\%$. Such image disparity maps may selectively be defined for both forward and backward mapping.

The image disparity maps allow to calculate a pictorial edit distance PED between the query and reference images 210 and 220, $$PED = \lambda 1 \cdot \delta 1 + \lambda 2 \cdot \delta 2 + \lambda 3 \cdot \delta 3, \quad \text{(Eq. 1)}$$

where $\lambda 1$, $\lambda 2$, and $\lambda 3$ are scalar weights. Such scalar weights are selectively associated with particular types of block matching errors and conditions (for example, illumination pattern or pose of the target 215 or object 225, and the like), at which the query or reference images 210 and 220 were obtained. In an alternate embodiment, the PED is calculated in both forward ($PED_F$) and backward ($PED_B$) directions.

In an enhanced version of the algorithm, individual blocks may be assigned a weight based on their significance or importance in making the overall determination of a match. Preferably, blocks which contain more details (as measured by high frequency details in the image) are considered more significant and are therefore assigned a higher weight than blocks which are smooth and do not contain much high frequency information. The significance or importance of a block can be determined by the energy in high frequency coefficients using techniques such as block-based Discrete Cosine Transform (DCT) or the Fast Fourier Transform (FFT). Other ways to measure the importance of a block is through an edge detector or a high pass filter to determine how many edges the block contains.

In another aspect of the enhanced algorithm, certain blocks can be ignored or assigned a low weight in the overall calculation of the PED based on a priori knowledge of the rotation or relative profiles of the query and reference blocks, as determined using a preprocessor as described above. For example, with respect to the matching of faces, if a frontal profile is being matched to a right profile, it can be expected that the right and left edges of the face will generate poor matches because these are not areas of the face that are visible in a frontal profile. Therefore, these blocks can be ignored or assigned a low weight while areas where we expect to have a good match based on the rotation may be assigned higher weights.

At step 150, a degree of correlation between the elementary blocks 230 of the query and reference images 210 and 220 is expressed in terms of the Levenshtein algorithm for matching or searching one-dimensional data strings as follows: (i) one-to-many correspondence between the elementary blocks is asserted as an equivalent of an Insertion term, (ii) one-to-none correspondence between the elementary blocks is asserted as an equivalent of a Deletion term, (iii) partial matching between the elementary blocks is asserted as an equivalent of a Substitution Error term, and (iv) a pictorial edit distance between the compared images is asserted as an equivalent of the Levenshtein's Edit Distance.

Herein, the term "one-to-many correspondence" relates to an elementary block 230 matching two or more elementary blocks of the other image (i.e., elementary block which cost function, with respect to such elementary blocks of the other image, is smaller than Q1). Accordingly, the term "one-to-none correspondence" relates to an elementary block 230 having no match among the elementary blocks of the other image (i.e., elementary block which cost function, with respect to the elementary blocks of the other image, is greater than Q2). The term "partial matching" relates to the elementary blocks 230 which cost functions, with respect to the elementary blocks of the other image, are disposed between Q1 and Q2, i.e., $Q1 \leq Q \leq Q2$.

Using the terms of the Levenshtein algorithm, the pictorial edit distance PED between the query and reference images 210 and 220 may be expressed as $$PED = \lambda 1^*(\text{percentage of Insertions}) + \lambda 2^*(\text{percentage of Deletions}) + \lambda 3^*(\text{percentage of Substitution Error}).$$ (Eq. 2)

Such association of inter-correlation parameters of the elementary blocks 230 (i.e., elements of graphical data) with the Insertion, Deletion, and Substitution Error terms allows to utilize computational models and resources of the otherwise text-oriented Levenshtein algorithm for comparing 2D images and, in particular, graphical contents of the query and reference images 210 and 220.

When the images 210 and 220 are obtained in an uncontrolled environment where poses of the target 215 or the object 225 or illumination conditions could vary in broad ranges, the weights $\lambda 1$ and $\lambda 2$ may be lowered. Such computational flexibility provides robustness of the method 100 against partial occlusions, variations in orientation and lighting patterns, among other factors affecting the process of comparing of the query or reference images 210 and 220. In particular, the Levenshtein algorithm allows, via computerized analysis of the images 210 and 220, to determine graphical elements contributing to disparity between specific portions of the images (for example, disparity between the object 225 and target 215 or elements thereof), and suggest means leading to matching of such portions.

At step 160, the Levenshtein algorithm is used to determine a similarity score S and a total similarity score $S_T$ between the query image 210 and the reference image 220. In one embodiment, the similarity score S is defined as a complement to the pictorial edit distance PED, i.e., $$S = 1 - PED,$$ (Eq. 3)

and a total similarity score $S_T$ is determined as a weighted sum of the similarity scores for forward ($S_F$) and backward ($S_B$) directions, $$S_T = S_F + S_B = \beta 1 \cdot (1 - PED_F) + \beta 2 \cdot (1 - PED_B),$$ (Eq. 4)

where $\beta 1$ and $\beta 2$ are scalar weights. When matching errors between the forward and backward mappings are statistically independent, $\beta 1 \approx \beta 2 \approx 0.5$.

In one embodiment, values of the pictorial edit distances and, respectively, values of the similarity scores are normalized to an interval from 0 to 1. In this embodiment, PED=0 and S=1 when the images 210 and 220 are identical, and PED=1 and S=0 when these images have no matches.

In enhanced versions of the algorithm, where the rotation is determined as discussed above, the forward ($S_F$) or backward ($S_B$) scores may be weighted or ignored in the overall calculation of the similarity score $S_T$ based on the direction that is determined to yield the best fit. For example, with respect to faces, the best fit can be expected when going from a frontal pose to a left or right profile, and therefore this direction should be used or assigned a higher weight. On the other hand, a poor result may be expected when going from a left or right profile to a frontal pose and therefore this component should be discarded or assigned a lower weight. If both images have approximately the same pose, then both the forward and backward components may be used.

At step 170, the method 100 queries if the similarity score S or, alternatively, the total similarity score $S_T$ exceeds a pre-selected threshold T for numerical values of the similarity scores. If the query of step 170 is affirmatively answered, the method 100 proceeds to step 180, where the method 100 identifies the target 215 in the query image 210 as the object 225 depicted in the reference image 220. If the query of step 170 is negatively answered, the method 100 proceeds to step 190, where the method 100 defines absence of the object 225 in the query image 210, i.e., determines that the target 215 is not the object 225.

In exemplary embodiments, the method 100 may be implemented in hardware, software, firmware, or any combination thereof in a form of a computer program product comprising computer-executable instructions. When implemented in software, the computer program product may be stored on or transmitted using a computer-readable medium adapted for storing the instructions or transferring the computer program product from one computer to another.

Figure 3:
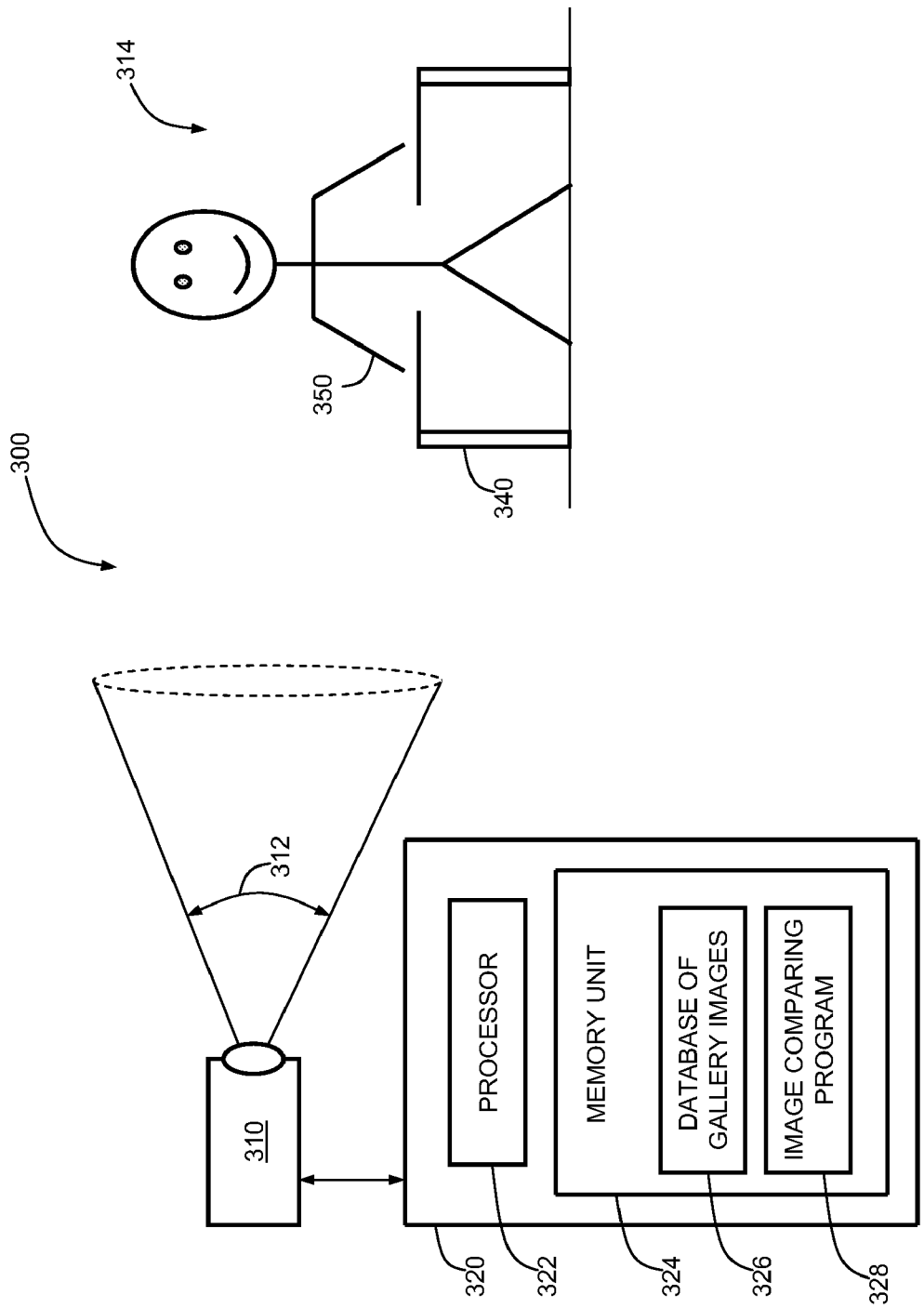
FIG. 3 is a high-level, schematic diagram of an exemplary system using the method of FIG. 1.

FIG. 3 is a high-level, schematic diagram of an exemplary system 300 using the method 100. The system 300 illustratively includes at least one surveillance monitor 310 (one surveillance monitor is shown), an analyzer 320 of data provided by the monitor 310, and a checkpoint (for example, automatic turnstile) 340. The surveillance monitor 310 has a 3D viewing field 312, and the checkpoint 340 is disposed within boundaries of a region 314 controlled using the monitor 310. An individual 350 may pass through the checkpoint 340 only if positively identified by the system 300.

In one embodiment, the surveillance monitor 310 is a digital video-recording device, and the analyzer 320 is a computer having a processor 322 and a memory unit 324. The memory unit 324 is meant to include, but not be limited to, 15 storage medium, such as hard disk drives (and other magneto based storage) and optical storage medium such as CD-ROM, DVD or HD or Blu-Ray disks. In some embodiments, the analyzer 320 or portions thereof may be disposed remotely from the surveillance monitor(s) 310. Alternatively, the analyzer 320 may be a portion of the surveillance monitor 310.

The memory unit 324 includes a database 326 of images of individuals authorized for passing (or not authorized for passing) through the checkpoint 340 (i.e., database of the reference images 220) and an image comparing program, or software, 328. The image comparing program 328 encodes, in a form of computer instructions, the method 100. When executed by the processor 322, the program 328 performs processing steps of the method 100.

In operation, the surveillance monitor 310 produces a picture(s) of the individual 350 (i.e., generates at least one query image 210) suitable for comparing with the reference images stored in the database 326. Individuals, which images, when compared with respective reference images, have similarity scores S (or $S_T$) exceeding a certain value (i.e., pre-selected threshold T) are recognized by the system 300 and, as such, allowed to pass through the checkpoint 340.

Although the invention herein has been described with reference to particular illustrative embodiments, it is to be understood that these embodiments are merely illustrative of the principles and applications of the present invention. Therefore numerous modifications may be made to the illustrative embodiments and other arrangements may be devised without departing from the spirit and scope of the present invention, which is defined by the appended claims.

What is claimed is:

1. A system for finding a distance between query and reference images, comprising:
   a computer;
   software, running on said computer, said software performing the functions of:
   (a) identifying a degree of rotation between an object identified in said query image and an object identified in a reference image;
   (b) dividing said query and reference images into blocks of pixels and identifying corresponding blocks in said reference image;
   (c) applying an offset from said blocks of pixels in said query image to aid corresponding block of pixels in said reference image, said being offset based on said identified degree of rotation between said object in said query image and said object in said reference image;
   (d) comparing each of said blocks in said query image to a corresponding block in said reference image with said applied offset, using a block matching algorithm;
   (e) determining the percentage of blocks from said query image that match a corresponding block in said reference image; and
   (f) determining said distance between said query and said reference images based on said percentage of matches.

2. The system of claim 1 wherein the magnitude of said offset applied between a block of pixels in said query image and said corresponding block of pixels in said reference image is based on said identified degree of rotation between an object identified in said query image and an object identified in a reference image.

3. The system of claim 1 wherein step (e) further comprises using a weighted percentage, with the weight of each block being based on the expected disparity between a block in said query image and its corresponding block in said reference image.

4. The system of claim 3 wherein said expected disparity is based on said identified degree of rotation between an object identified in said query image and an object identified in a reference image.

5. The system of claim 4 wherein certain blocks may be given a zero weight or ignored, based on said expected disparity.

6. The system of claim 1 wherein step (e) further comprises using a weighted percentage, with the weight of each block being based on the significance of the block.

7. The system of claim 6 wherein the significance of a particular block can be determined by the high frequency details in said block.

8. The system of claim 7 wherein said high frequency details can be determined using a Discrete Cosine Transform or a Fast Fourier Transform.

9. The system of claim 6 wherein the significance of a particular block can be determined by the number of edges detected therein.

10. The system of claim 9 wherein an edge detector or a high pass filter is used to determine the number of edges.

11. The system of claim 1 further performing the function of repeating steps (a)-(f) with said images reversed to obtain a forward distance and a backward distance.

12. The system of claim 11 wherein the overall distance is a weighted sum of said forward and said backward distances.

13. The system of claim 12 wherein said weighting of said forward and backward distances is based on said indentified degree of rotation between an object identified in said query image and an object identified in a reference image.

14. The system of claim 1, wherein step (b) comprises selecting blocks of pixels each comprising M×N pixels, where M and N are integers.

15. The system of claim 1, wherein the step (b) further comprises defining pluralities of matrixes of non-overlapping blocks of pixels for at least one of the query image or the reference image.

16. The system of claim 1, wherein the step (d) further comprises using a block matching algorithm to performing a pixel-by-pixel comparison of the blocks of pixels.

17. The system of claim 1, wherein the step (d) further comprises producing at least one image disparity map defining the degree of correlation between blocks of pixels in said query image and their corresponding blocks of pixels in said reference image.

18. The system of claim 1, wherein the step (e) further comprises determining if a block of pixels in said query image has a one-to-none, one-to-many, or one-to-one correspondence with corresponding blocks in said reference image.

19. The system of claim 1 wherein:
   a one-to-many correspondence exists between the blocks of pixels when a value of the matching function is smaller than a first pre-selected threshold;
   a one-to-none correspondence exists between the blocks of pixels when a value of the matching function is greater than a second pre-selected threshold; and
   a partial correspondence exists between the blocks of pixels when a value of the matching function is between the first and second pre-selected thresholds.

20. The system of claim 19 wherein:
   a low or zero weight is attached to blocks in said query image having a one-to-many or a one-to-none correspondence with blocks in said reference image; and
   a high weight is attached to blocks in said query image having a one-to-one correspondence with blocks in said reference image.

* * * * *